United States Patent [19]

Staggs et al.

[11] Patent Number: 4,845,742
[45] Date of Patent: Jul. 4, 1989

[54] DYNAMIC MICROPHONE HANDSET AND AMPLIFIER UNIT

[75] Inventors: Gregory D. Staggs; Richard S. Brown, both of Sanford, Fla.

[73] Assignee: Wintel Service Corporation, Longwood, Fla.

[21] Appl. No.: 237,074

[22] Filed: Aug. 29, 1988

[51] Int. Cl.$^4$ .................... H04M 17/00; H04M 1/66
[52] U.S. Cl. .................................... 379/155; 379/145
[58] Field of Search .................... 379/155, 145, 395

[56] References Cited

U.S. PATENT DOCUMENTS 2,791,634  5/1957  Lomax ............................... 379/155

Primary Examiner—Stafford D. Schreyer

[57] ABSTRACT

A dynamic microphone and dynamic microphone amplifier used with a pay station telephone system has the amplifier physically located within a pay station and includes an isolation transformer to prevent ground faults in the dynamic microphone in the handset from being sensed by telephone network control circuitry. The dynamic microphone amplifier is mounted on a printed circuit board which includes an isolation transformer for the speaker element in the receiver of the handset. The leads from the transmitter dynamic microphone and receiver speaker are connected to the amplifier circuit board by way of a modular pin connector physically located in the pay station housing. The isolation transformers function as ground fault isolation devices to prevent ground faults in the handset from affecting the operation of the associated telephone system and to reduce the risk of electrric shock to a user.

20 Claims, 3 Drawing Sheets

DYNAMIC MICROPHONE HANDSET AND AMPLIFIER UNIT

BACKGROUND OF THE INVENTION

1. Field of the Invention

The present invention relates to dynamic microphone handsets and amplifier units in telephone circuitry and particularly to ground fault isolation circuitry associated therewith.

2. Prior Art

Microphone amplifiers for the microphones used in a telephone handset are quite well known and varied. In many cases, a carbon microphone is used in the handset because of the low cost and a certain level of background noise suppression that is inherent in this type of microphone. Dynamic microphones, however, are replacing carbon granule microphones because of greater audio fidelity and lower internal noise.

The replacement of a carbon microphone with a dynamic microphone involves more than a simple microphone device swap because of the need to ensure that the proper circuitry, including the signal amplifier is included.

In addition to the need to interface to the existing signal amplifier in the event of a retrofit change in microphone, pay telephone stations are vulnerable to a type of fraud known as "pinning" involving the introduction of a ground fault in the handset circuitry. Accordingly, there is a need to provide an amplifier for a dynamic microphone, either installed as original equipment or as a replacement, that eliminates ground-fault initiated fraud. Also, an electric shock hazard can be present if continued hard use results in chafing and breakdown of the insulation on the wires routed inside the usual armored cable that connects the handset to the pay station housing.

The present invention includes the placement of the dynamic microphone amplifier in the pay station housing rather than in the handset. Furthermore, an isolation transformer is used to prevent ground faults in the transmitter portion of the handset from being introduced in a manner that allows fraudulent use of the phone. Quite importantly, the dynamic microphone amplifier is mounted on a printed circuit board having a second isolation transformer for the receiver circuitry and speaker element in the handset. The four leads to the handset are wired into a 4-pin connector plug that is physically mounted within the pay station housing. Thus, the present invention provides distinct advantages over the usual dynamic microphone amplifiers, such as that disclosed in U.S. Pat. Ser. No. 4,378,467, which cannot be used to prevent fraud. The present invention provides for ease of installation and ground fault isolation in addition to amplification of the dynamic microphone signal.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 5 is a schematic diagram of the receiver element and isolation transformer used in the present invention.

SUMMARY OF THE INVENTION

In the present invention a telephone amplifier assembly for use in a telephone pay station connected to a central office telephone system and having a handset associated therewith including a dynamic microphone transmitter and a receiver and a cord for connecting a dynamic microphone transmitter and a receiver to a telephone pay station comprising amplifier means adapted to be disposed within a telephone pay station and having an input from a dynamic microphone transmitter in a handset and an output to a central office telephone system. The amplifier assembly also includes ground fault isolation means disposed within a pay station and connected to an input from a dynamic microphone transmitter and to a receiver for preventing a ground fault in a handset from affecting the operation of a central office telephone system. The amplifier means includes a transmitter audio amplifier and the ground fault isolation means includes a transformer having a primary winding and a secondary winding, with the input of the amplifier being connected to the secondary winding and the primary winding being connected to a dynamic microphone transmitter in a handset. A second transformer has a secondary winding connected to a central office telephone system and a primary winding connected to a receiver. The amplifier means and ground fault isolation means transformers are mounted on a circuit board physically located in a pay station and connected to a handset via a plug also located within a pay station.

DETAILED DESCRIPTION OF THE PREFERRED EMBODIMENT

Figure 1:
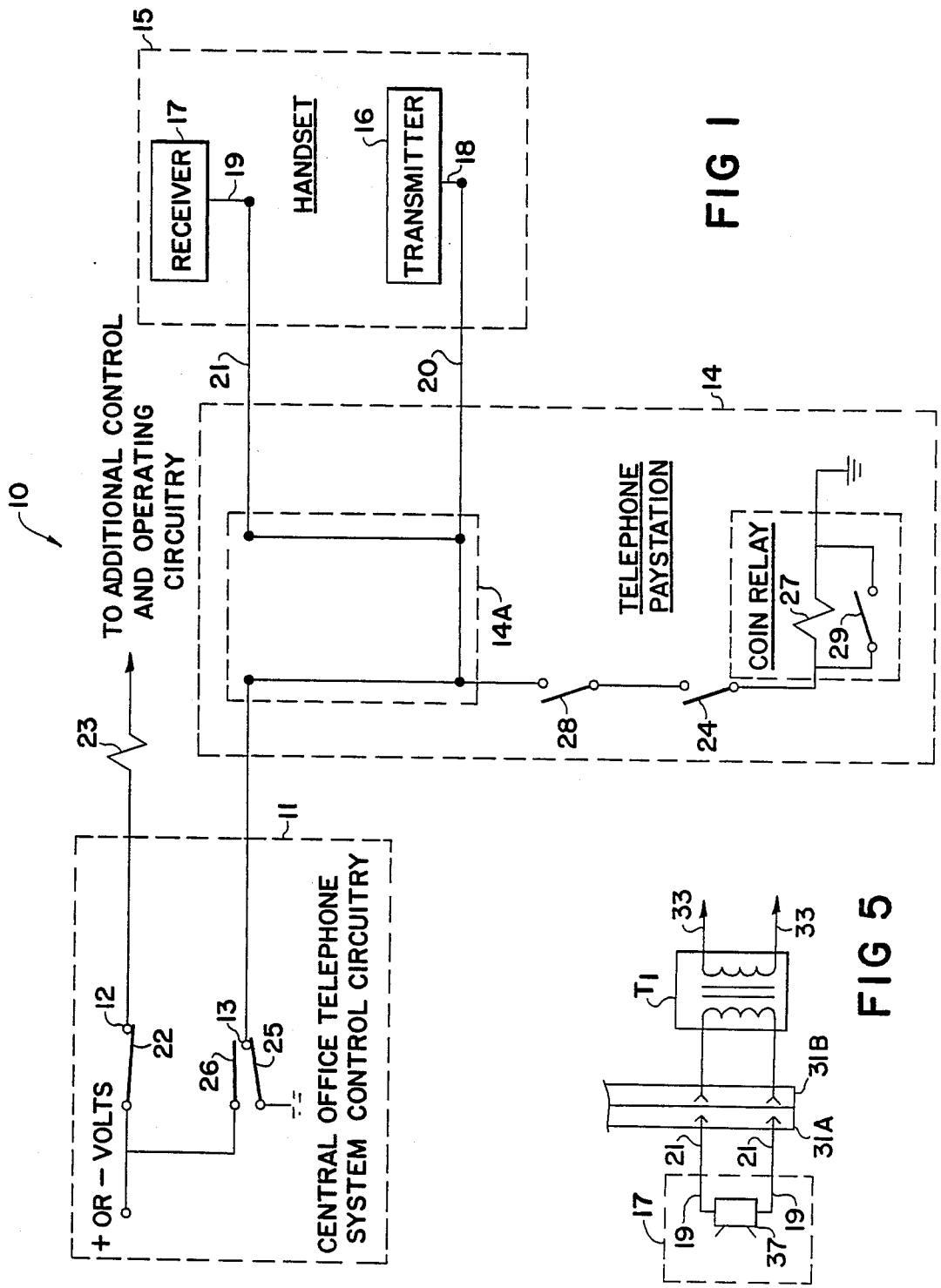
FIG. 1 is a simplified wiring diagram of a telephone system employing pay telephone station and a handset according to the prior art.

In FIG. 1, a simplified diagram of a pay telephone system is depicted by the numeral 10. Central office control circuitry 11 is physically located in the telephone switching system and includes two terminals 12 and 13 to which voltage is applied via relays (not shown). Pay station 14 includes handset 15 containing a conventional transmitter 16 and receiver 17 with mouthpieces and circuitry (not shown) that are connected to insulated leads 18 and 19 respectively. Handset is physically connected to station 14 via a conventional armored cable (not shown) containing insulated wires 20 and 21 which are electrical extensions of respective leads 18 and 19 and numbered separately for purposes of illustration.

To make a telephone call from station 14, handset 15 is removed from its cradle thereby activating relays (not shown) which will allow negative voltage applied to terminal 12 via contact 22 to energize relay 23 which will place a dial tone on the line. Relay 23, when energized, opens contacts 24. After hearing a dial tone via receiver 17, the user will deposit coins in station 14.

After a sufficient number of digits have been dialed, control circuitry 11 will (1) open contacts 22 for deenergizing relay 23 and closing contacts 24; (2) open ground contact 25 on terminal 13; and (3) close contact 26 placing voltage at terminal 13. If the proper coins were deposited, central office control circuitry will detect a ground on the line from terminal 13 because a coin-operated relay (not shown) will have closed contact 28.

The internal control circuitry of the pay station 14 is illustrated by block 14A. The control circuitry 14A varies with the manufacturer of the pay station 14 and includes dialing tone generators, recorded message relays, totalers for reading a series of deposited coins, and power for the handset elements in the conventional manner. The circuitry of 14A is not shown in detail for purposes of the present discussion. Rather only the simplified wiring diagram need be presented to describe the operation of the telephone circuitry and the limitations that exist with the arrangements in the prior art. Specifically, control circuitry 14A illustrates the electrical connections between central office control circuitry 11 and handset 15 and the absence of ground fault isolation apparatus associated therewith.

As can be seen from the simplified wiring illustrated, a ground placed in the system via transmitter leads 18 or receiver leads 19 would be read by the central office control circuitry 11 regardless of the position of contact 28. Thus, a user can cheat the telephone company by grounding leads 18 or 19. This type of fraud is known in the art as "pinning" and is a serious problem for telephone companies.

FIG. 1 can also be used to describe another problem facing telephone companies. When a call has been completed and the handset 15 returned to its cradle, the central office control circuitry 11 will place a high voltage (130 vdc) on terminal 13 to energize relay 27, close contact 29, and collect deposited coins. Accordingly, if leads 20 and 21 are in contact with the armored cable because of broken insulation, an electric shock hazard is present to the user.

In addition to ground fault based fraud regarding the initial deposit of coins, it is also possible to cause a refund of deposited coins by placing a ground fault on leads 18 or 19 to prevent the operation of coin relay 27.

The present invention is designed to both eliminate the electric shock hazard of a coin collection operation and the fraudulent practice of "pinning" while providing for an improved amplifier for transmitter 16.

The present invention is specifically designed as a retrofit for replacing the conventional carbon microphone handset 15 with a dynamic microphone handset. The unit provides a dynamic microphone handset and/or a dynamic microphone audio amplifier which is mounted within a pay station housing and provides for signal isolation to prevent "pinning" fraud and electric shock protection. Quite uniquely, the particular device used in the present invention also includes isolation for the conventional receiver speaker located in a handset.

Figure 2:
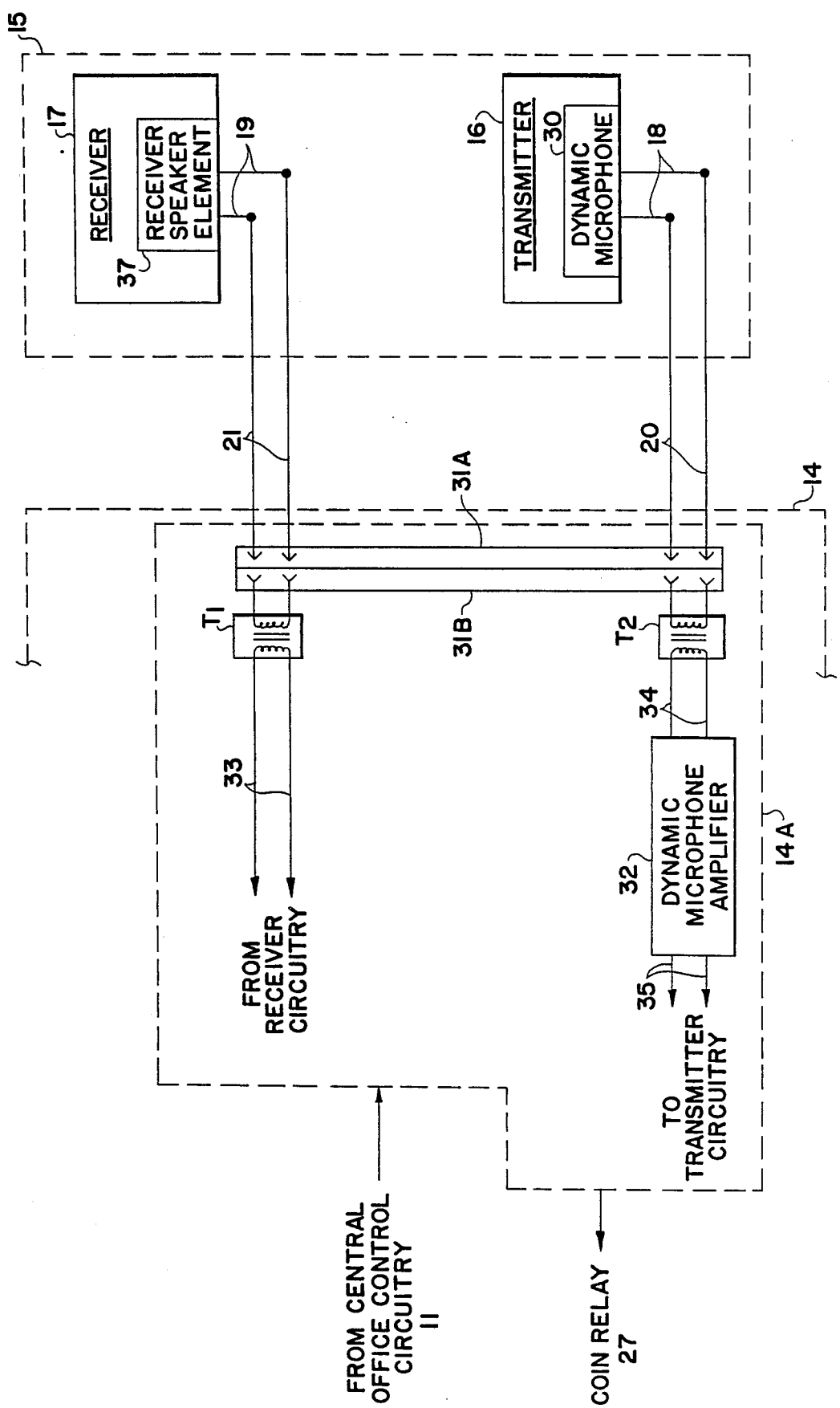
FIG. 2 is a wiring diagram illustrating the electrical connections and physical placement of the components in accord with the present invention.

With reference now to FIG. 2, a simplified diagram illustrates a handset 15 having a transmitter unit 16 and a receiver unit 17 and a dynamic microphone 30 used in the transmitter 16. Leads 18, 20 and 19, 21 are shown as two wires in the actual applications. As understood in the art, wires 20 and 21 are enclosed within an armored cable that is connected to the pay station housing 14.

Inside pay station housing 14, two 4-wire modular connectors 31A and 31B are used to connect leads 20 and 21 to two transformers, T1, for isolating receiver 17 from receiver circuitry connected via leads 33, and T2, for isolating the microphone 30 in transmitter 16 from dynamic microphone amplifier 32 and associated telephone circuitry which is connected to leads 35.

As can be seen from FIG. 2, a ground fault on leads 18 is isolated from transmitter circuitry in internal control circuitry 14A by transformer T2 and also isolated from the associated coin relay 27 and central office control circuitry 11. Accordingly, "pinning" fraud is not possible without access to the inside of pay station housing 14. Similarly, "pinning" fraud is not possible via a ground fault on leads 19 of receiver 17 because of the isolation provided by transformer T1.

The isolation provided by transformers T1 and T2 also serves to eliminate the electric shock hazard that can result if the insulation on any of the leads 18, 20 and 19, 21 breaks or wears away and allows the conductors to make contact with the armored cable. The high voltage coin handling signal from central office control circuitry 11 is isolated from the circuitry outside of pay station housing 14 by the same transformers T1 and T2.

Figure 3:
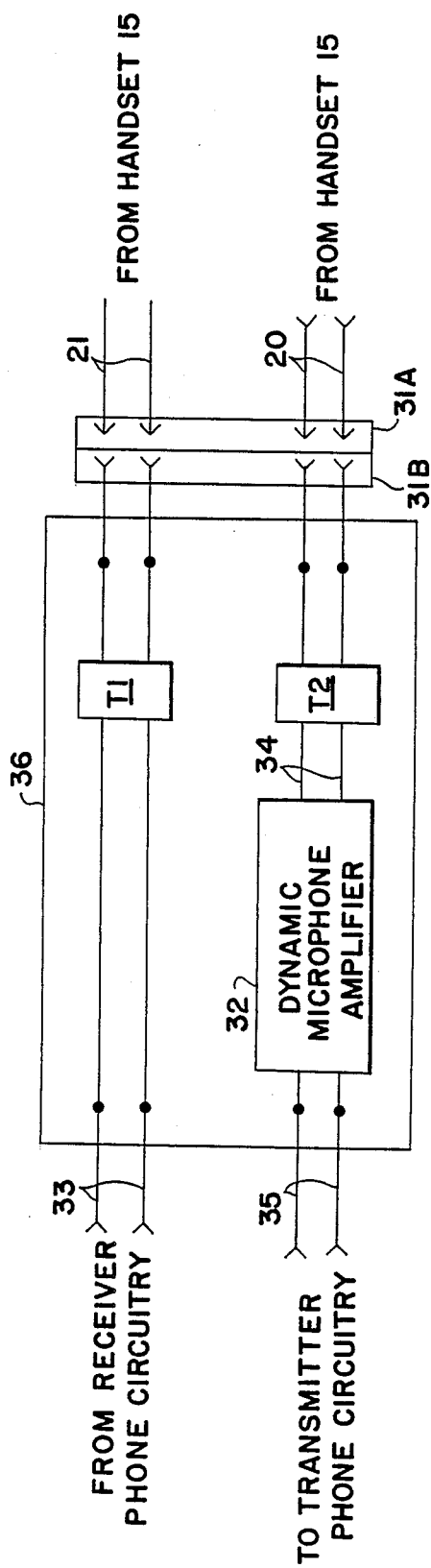
FIG. 3 is a diagram illustrating the physical layout of the connections to the circuit board used in the present invention.
Figure 4:
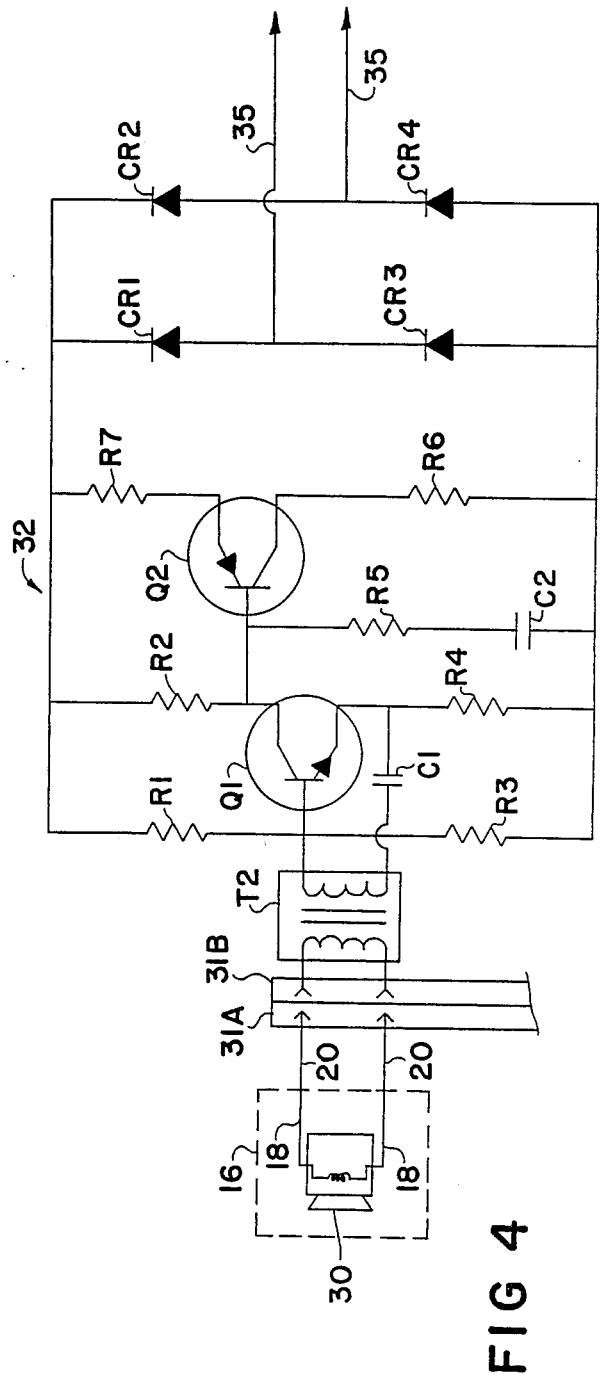
FIG. 4 is a schematic diagram of the dynamic microphone amplifier of FIG. 2.

The preferred embodiment of the dynamic microphone amplifier assembly is illustrated in FIGS. 3, 4 and 5. FIG. 3 is a pictorial layout of a printed circuit board 36 upon which are mounted transformers T1 and T2 and dynamic microphone amplifier 32. Board 36 is physically mounted within pay station housing 14.

Referring now to FIG. 4, dynamic microphone 30 provides an electrical signal via leads 20 to 4-pin connector 31 and through isolation transformer T2 to the base of transistor Q1 which functions as a signal amplifier. The amplified output is applied to the base of Q2 which varies the current level on output leads 35. Diodes CR1–CR4 function as a polarity guard to protect amplifier transistors Q1 and Q2 from damage in the event of a polarity reversal on leads 35. Resistors R1–R7 and capacitors C1–C2 have values that are chosen to provide for impedance matching and the proper operation of Q1 and Q2 as is understood in the art.

Referring now to FIG. 5, a conventional speaker element 37 is used in receiver 17 and receives a signal via leads 21 and 4-pin connectors 31A and 31B from the secondary winding of transmitter T1. Leads 33 connect to the receiver telephone circuitry in the usual manner.

To retrofit a given pay station 14 for use with a dynamic microphone 30 in the handset 15, the existing handset is removed and replaced with a handset 15 equipped with dynamic microphone 30. Leads 20 and 21 of this handset are inserted into connector 31A which is then plugged into 4-pin connector 31B within pay station housing 14. Connector 31 is wired to circuit board 36 as illustrated in FIG. 3. Output leads 33 and 35 are color-coded to match the corresponding leads 20 and 21 as understood in the art and are simply connected to the pay station control circuitry 14A in the usual manner. Once installed, the ground fault or "pinning" fraud problem both with regard to initial coin deposit or coin refund is not possible from the handset 15 alone. Further, isolation transformers eliminate the electric shock hazard that may be present during coin collection.

To summarize the present invention and its operation, a dynamic microphone amplifier 32 and associated circuit board 36 comprise an assembly which provides for signal amplification of the output from dynamic microphone 30 and ground fault isolation of the electrical wires 18, 20 and 19, 21 in handset 15 by way of isolation transformers T1 and T2. The use of a modular design and construction approach to the present invention via circuit board 36 allows an easy and inexpensive means by which to provide ground fault isolation for both the transmitter 16 and receiver 17.

The amplifier 32 is specifically designed for use with a dynamic microphone 30. All of the components of the assembly such as the transformers T1 and T2, amplifier 32, and pin connectors 31A and 31B are physically located within pay station 14 in order to make it difficult to introduce a ground fault which would defraud the telephone system.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A telephone amplifier assembly for use in a telephone pay station connected to a central office telephone system and having a handset associated therewith including a dynamic microphone transmitter and a receiver and a cord for connecting a dynamic microphone transmitter and a receiver to a telephone pay station comprising amplifier means adapted to be disposed within a telephone pay station and having an input from a dynamic microphone transmitter in a handset and an output to a central office telephone system, and isolation means disposed within a pay station and connected to an input from a dynamic microphone transmitter and to a receiver for preventing a ground fault in a handset from affecting the operation of a central office telephone system.

2. The telephone amplifier assembly as defined in claim 1 wherein said amplifier means includes a transmitter audio amplifier receiving an input from a dynamic microphone transmitter in a handset.

3. The telephone amplifier assembly as defined in claim 1 wherein said isolation means includes a transformer having a primary winding and a secondary winding, said input of said amplifier means being electrically connected to said secondary winding, said primary winding being connected to a dynamic microphone transmitter.

4. The telephone amplifier assembly as defined in claim 1 wherein said isolation means includes a first transformer having a primary winding connected to a dynamic microphone transmitter and a secondary winding connected to said input of said amplifier means, a second transformer having a primary winding electrically connected to a receiver and a secondary winding connected to a central office telephone system.

5. In a central office telephone system including telephone pay stations connected to a central office telephone system, a pay station having a handset with a receiver and a dynamic microphone transmitter located therein, a handset electrically connected to a pay station, ground fault isolation means connected between a central office telephone system and a handset, said ground fault isolation means being adapted to be disposed within a pay station for preventing a ground fault in a handset from affecting the operation of a central office telephone system.

6. In the system as defined in claim 5 wherein said ground fault isolation means includes a pair of isolation transformers, one said transformer connected between a dynamic microphone transmitter and a central office telephone system, the other said transformer being connected between a receiver and a central office telephone system.

7. In the system as defined in claim 5 further including circuit means in a pay station for receiving a signal from a dynamic microphone transmitter and amplifying said signal.

8. A telephone amplifier assembly for use in a telephone pay station connected to a central office telephone system and having a handset associated therewith including a dynamic microphone transmitter and a receiver to a pay station, said amplifier assembly comprising amplifier means adapted to be disposed within a pay station and having an input from a dynamic microphone transmitter in a handset and an output to a central office telephone system.

9. The telephone amplifier assembly as defined in claim 8 wherein said amplifier means includes a transmitter audio amplifier receiving an input from said dynamic microphone in a handset.

10. The telephone amplifier assembly as defined in claim 9 wherein said amplifier assembly further includes a first isolation transformer for preventing a ground fault in a handset from affecting the operation of a central office telephone system, said first transformer having a primary winding and a secondary winding, said primary winding being connected to said dynamic microphone, and said secondary winding being connected to said amplifier means and providing an input thereto.

11. The telephone amplifier system as defined in claim 10 wherein said first isolation transformer is located in a pay station.

12. The telephone amplifier assembly as defined in claim 10 wherein said amplifier assembly means further includes a second isolation transformer for preventing a ground fault in a handset from affecting the operation of a central office telephone system, said second transformer having a primary winding and a secondary winding, said primary winding being connected to a receiver, and said secondary winding being connected to a central office telephone system.

13. The telephone amplifier assembly as defined in claim 12 wherein said second isolation transformer is located in a pay station.

14. A telephone amplifier assembly for use in a telephone pay station connected to a central office telephone system comprising in combination a handset for use with a telephone pay station, said handset including a dynamic microphone transmitter and a receiver and a cord for connecting said transmitter and said receiver to a pay station, amplifier means adapted to be disposed within a pay station and having an input from said transmitter, and isolation means disposed within a pay station and connected to said input from said transmitter and to said receiver for preventing a ground fault in said handset from affecting the operation of a central office telephone system.

15. The telephone amplifier assembly as defined in claim 14 wherein said amplifier means includes a transmitter audio amplifier receiving an input from said transmitter in said handset.

16. The telephone amplifier assembly as defined in claim 14 wherein said isolation means includes a transformer having a primary winding and a secondary winding, said input of said amplifier means being electrically connected to said secondary winding and said primary winding being connected to said transmitter.

17. The telephone amplifier assembly as defined in claim 16 wherein said isolation means further includes a second transformer having a primary winding and a secondary winding, said primary winding being connected to said receiver, and said secondary winding being connected to the central office telephone system.

18. A telephone amplifier assembly for use in a telephone pay station connected to a central office telephone system comprising in combination a handset for use with a telephone pay station, said handset including a dynamic microphone transmitter and a receiver and a cord for connecting said transmitter and said receiver to a pay station, amplifier means disposed within a telephone pay station and having an input from said transmitter.

19. The telephone amplifier assembly as defined in claim 18 further including isolation means adapted to be disposed within a pay station and connected to said input from said transmitter for preventing a ground fault in said transmitter from affecting the operation of a central office telephone system.

20. The telephone amplifier assembly as defined in claim 18 further including isolation means adapted to be disposed within a pay station and connected to said receiver for preventing a ground fault in said receiver from affecting the operation of a central office telephone system.

* * * * *